United States Patent
Feng et al.

(10) Patent No.: US 10,740,520 B2
(45) Date of Patent: Aug. 11, 2020

(54) PESSIMISM IN STATIC TIMING ANALYSIS

(71) Applicant: Synopsys, Inc., Mountain View, CA (US)

(72) Inventors: Chunyang Feng, Shanghai (CN); Jianquan Zheng, Shanghai (CN); Fulin Peng, Shanghai (CN)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/766,782

(22) PCT Filed: Apr. 14, 2017

(86) PCT No.: PCT/CN2017/080633
§ 371 (c)(1),
(2) Date: Apr. 6, 2018

(87) PCT Pub. No.: WO2018/188081
PCT Pub. Date: Oct. 18, 2018

(65) Prior Publication Data
US 2020/0026812 A1      Jan. 23, 2020

(51) Int. Cl.
*G06F 30/3312* (2020.01)
*G06F 30/367* (2020.01)
(Continued)

(52) U.S. Cl.
CPC ... *G06F 30/3312* (2020.01); *G01R 31/31725* (2013.01); *G06F 30/35* (2020.01); *G06F 30/367* (2020.01); *G06F 2119/12* (2020.01)

(58) Field of Classification Search
CPC .................................................. G06F 17/5031
(Continued)

(56) References Cited

U.S. PATENT DOCUMENTS 7,155,691 B2    12/2006  Ratzlaff
9,875,333 B1 *   1/2018  Verma ................. G06F 17/5031
(Continued)

FOREIGN PATENT DOCUMENTS

CN       202904427 U     4/2013
CN       105701266 A     6/2016

OTHER PUBLICATIONS

International Search Report and Written Opinion dated Jan. 15, 2018, State International Property Office of the P.R. China (ISA/CN).
(Continued)

*Primary Examiner* — Suresh Memula
(74) *Attorney, Agent, or Firm* — Park, Vaughan, Fleming & Dowler LLP; Laxman Sahasrabuddhe

(57) ABSTRACT

The disclosure relates to a method, computer program product or data processing system for performing graph-based static timing analysis, GBA, of an integrated circuit design having a set of timing paths. The method comprises identifying a subset of the set of timing paths and performing path-based analysis, PBA, of the subset of timing paths to determine at least one PBA timing parameter for each timing path of the subset of timing paths. The method further comprises determining at least one optimized GBA timing parameter for at least one timing path of the subset of timing paths by minimizing a function that is based on a difference between the at least one optimized GBA timing parameter and the at least one PBA timing parameter of the at least one timing path.

20 Claims, 4 Drawing Sheets

(51) Int. Cl.
*G06F 30/35* (2020.01)
*G01R 31/317* (2006.01)
*G06F 119/12* (2020.01)

(58) Field of Classification Search
USPC ......................................................... 716/113
See application file for complete search history.

(56) References Cited

U.S. PATENT DOCUMENTS 10,031,986 B1 * 7/2018 Kumar ................ G06F 17/5036
2016/0070844 A1 3/2016 Shyamsukha et al.
2016/0357894 A1 12/2016 Frederick, Jr. et al.

OTHER PUBLICATIONS

Extended European Search Report from EPO Application No. 17844596.1 dated Jul. 31, 2019.

* cited by examiner

PESSIMISM IN STATIC TIMING ANALYSIS

RELATED APPLICATION

This application is a 371 of, pending International Application No. PCT/CN2017/080633, entitled "A Method and Apparatus to Reduce the Graph Based Analysis Pessimism in Static Timing Analysis," by inventors Chunyang Feng, Jianquan Zheng and Fulin Peng, filed on 14 Apr. 2017.

BACKGROUND OF THE INVENTION

The present disclosure relates generally to electronic design automation, and in particular, to a computer implemented method for reducing pessimism in graph-based static timing analysis, GBA, of integrated circuits.

Current integrated circuit, IC, designs, may include an extremely large number, for example in the order of $10^7$-$10^8$ or even more, of cells such as logic gates and synchronous or sequential devices connected by interconnects. The synchronous or sequential devices include flip-flops and latches. Herein, a register denotes a synchronous or sequential device comprising at least one flip-flop or latch.

In such synchronous designs, violations of timing constraints may occur. Such violations may include setup time violations and hold time violations. A setup time violation occurs when a signal arrives too late at a register, while a hold time violation occurs when an input signal changes too soon after an active transition of a corresponding clock signal. The arrival time of a signal is subject to variations of several sources including variations in temperature, voltage, manufacturing processes and so forth.

Static timing analysis, STA, for example in the course of electronic design automation, EDA, is tasked with analyzing a circuit design to determine if timing constraints are met despite said variations to ensure proper operation of the IC. For example STA analyzes, whether all timing signals arrive at constrained cells or interconnects of the circuit design within a respective required time. The difference between arrival and required time may be measured as slack, wherein a negative slack means an arrival time of the respective timing signal violates the respective required time and may lead to unstable circuit behavior. Designers may have to ensure that there are no violating or negative slacks in the design in order to sign-off the design.

Path-based static timing analysis, PBA, may analyze each timing path in isolation. Unfortunately, analyzing all timing paths is a problem of exponential complexity in the size of the circuit. Thus, performing PBA on an entire circuit may be infeasible for large circuits due to a large runtime and/or memory overhead.

In contrast to PBA, where individual timing paths are analyzed in isolation, in GBA a multitude of timing paths is analyzed simultaneously. GBA may determine slack values with linear complexity in the size of the circuit. GBA may combine information from different timing paths which may lead to overestimation of delays and hence a pessimistic slack. A delay value is associated to each cell and each interconnect of the design to evaluate a delay of the timing paths of the design. To account for variations such as on-chip variations due to manufacturing variability, a global derating factor may be applied for the delay values of all cells and interconnects across the whole chip. However, such global derating factor leads to an overestimation in the number of violating paths in the circuit design and results in a too pessimistic estimation for the derated delay in particular with the increasing influence of on-chip variations.

Advanced on-chip variation, AOCV, analysis is an STA methodology whereby the derating factor of a cell or an interconnect in a timing path is taken to be a function of the path depth, that is the number of logic stages in the path, and a physical distance covered by the path. Both depth and distance are measured from the common point of a timing path, defined as the output pin of the last cell in the portion of the clock path common to launch and capture segments of the timing path.

However, due to its path-base nature, presently known AOCV analysis introduces a large amount of pessimism, i.e. under estimated path slack values, into GBA due to exaggerated derating factors. This pessimism originates for example from the following two sources:

i) signals launched at a register are associated with the common point resulting in the most conservative, that is worst-case, among the common points of all timing paths launched by that register, and ii) the AOCV metrics, that is logic depth and distance, applied at a given timing arc are dictated by the worst-case metrics for all timing paths which traverse that timing arc.

Any amount of extra pessimism in STA is harmful as it has a direct effect on both the development and verification effort and the performance and power profiles of the final product.

SUMMARY OF THE INVENTION

The present disclosure provides an improved concept for optimizing GBA by reducing pessimism and consequently improving accuracy and by reducing runtime and consequently improving efficiency compared to PBA.

According to the improved concept, a method for performing graph-based static timing analysis, GBA, of an integrated circuit design having a set of timing paths is provided. The method comprises identifying a subset of the set of timing paths and performing path-based analysis, PBA, of the subset of timing paths to determine at least one PBA timing parameter for each timing path of the subset of timing paths. The method further comprises determining at least one optimized GBA timing parameter for at least one timing path of the subset of timing paths by minimizing a function that is based on a difference between the at least one optimized GBA timing parameter and the at least one PBA timing parameter of the at least one timing path.

An advantage of such concept lies in the reduced pessimism compared to conventional GBA timing analysis. By minimizing the function based on the difference between the optimized GBA timing parameter and the PBA timing parameter, the optimized GBA timing parameter is being approximated to the corresponding PBA value. Since this process is only performed for a subset of the set of timing parameters, the process consumes less time than conducting PBA for the full set of timing parameters of the circuit design.

According to some implementations, determining at least one optimized GBA timing parameter comprises determining a correction factor for at least one selected circuit element of at least one timing path of the subset of timing paths.

Determining the correction factor for selected circuit elements of the at least one timing path of the subset creates an advantage because said correction factor is associated to a certain circuit element. For each circuit element occurring in each path of the subset of timing paths, a corresponding correction factor can be determined.

According to some implementations, the correction factor is stored and used to reduce pessimism in subsequent GBA of timing paths propagating along at least one of the selected circuit elements.

An advantage of this implementation lies in the application of said correction factor for subsequent GBAs of certain paths of interest or of a full circuit design. The optimization process as described above only needs to be conducted once, for a subset of paths. Subsequent GBA procedures can be optimized with the computed and stored correction factor and therefore be executed faster than a PBA for all paths of interest.

According to some implementations, in subsequent GBA a delay of each circuit element in at least one timing path of the GBA is multiplied with each corresponding correction factor if a correction factor has been determined and stored and with a factor one if no correction factor has been determined and/or stored.

According to some implementations, determining the at least one optimized GBA timing parameter is done by solving a quadratic programming problem.

According to some implementations, solving the quadratic programming problem is done by the gradient decent method and/or the interior point method and/or the active set method and/or the augmented Lagrangian method and/or the conjugate gradient method.

According to some implementations, the quadratic programming problem being solved comprises minimizing a quadratic cost function of the at least one optimized GBA timing parameter and the corresponding at least one PBA timing parameter subject to linear constraints regarding the at least one GBA timing parameter and the at least one PBA timing parameter.

According to some implementations, the quadratic cost function J to be minimized is:

$$J = \frac{1}{2} \sum_{i=1}^{m} (f^{(i)}(x) - y^{(i)})^2$$

wherein $y^{(i)}$ is the at least one PBA timing parameter of an i-th path of the subset of timing paths, m is a total number of paths of the subset of timing paths and $f^{(i)}(x)$ is the optimized GBA timing parameter of the i-th path and wherein $f^{(i)}(x)$ is defined as:

$$f^{(i)}(x) = \sum_j x_j d_j$$

wherein j represents the circuit elements occurring in the i-th path, $d_j$ is a delay of the j-th circuit element of the i-th path of the subset of timing paths and $x_j$ is the correction factor of the j-th circuit element of the i-th path.

According to some implementations, the at least one timing parameter comprises the slack time and the linear constraint on the slack time is given by the slack time of PBA being equal to or higher than the slack time of GBA and the correction factor is a delay multiplier.

An advantage of using the slack time as a timing parameter lies in the fact that the slack time often stands for one of the most important timing parameters for STA.

According to some implementations, the at least one timing parameter comprises the arrival time and the linear constraint on the arrival time is given by the arrival time of GBA being equal to or higher than the arrival time of PBA and the correction factor is a delay multiplier.

According to some implementations, the identified subset of timing paths is based on an initial GBA and the identified subset of timing paths is the subset of timing paths with lowest negative GBA slack time.

An advantage of such process to choose the subset of timing paths is, that such subset with lowest negative GBA slack time stands for the subset which may have the most pessimistic GBA values and therefore needs most correction.

According to some implementations, the number of identified timing paths of the subset of timing paths is predetermined.

Such predetermined number of timing paths may either be a percentage of paths with worst GBA slack time or an absolute number of paths with worst GBA slack time.

According to the improved concept, also a computer-program product comprising a computer-readable storage medium and a computer program module stored therein is provided. The computer program module contains instructions for performing graph-based static timing analysis, GBA, of an integrated circuit design having a set of timing paths. When the computer program module is being executed by a processor the instructions cause the processor to execute a process comprising steps, in particular all steps, of a method for performing GBA according to the improved concept described herein.

Further implementations of the computer-program product are readily derived by any person skilled in the art from the various implementations of the method.

According to the improved concept, also a data processing system for performing graph-based static timing analysis, GBA, of an integrated circuit design having a set of timing paths is provided. The data processing system comprises a processor and a memory storing program instructions which when executed by the processor execute steps, in particular all steps of a method for performing STA according to the improved concept described herein.

Further implementations of the computer system are readily derived by any person skilled in the art from the various implementations and embodiments of the method.

BRIEF DESCRIPTION OF THE DRAWINGS

In the following, the improved concept is explained in detail with the aid of exemplary implementations by reference to the drawings. Components that are functionally identical or have an identical effect may be denoted by identical references. Identical components and/or components with identical effects may be described only with respect to the figure where they occur first and their description is not necessarily repeated in subsequent figures.

DETAILED DESCRIPTION

Figure 1:
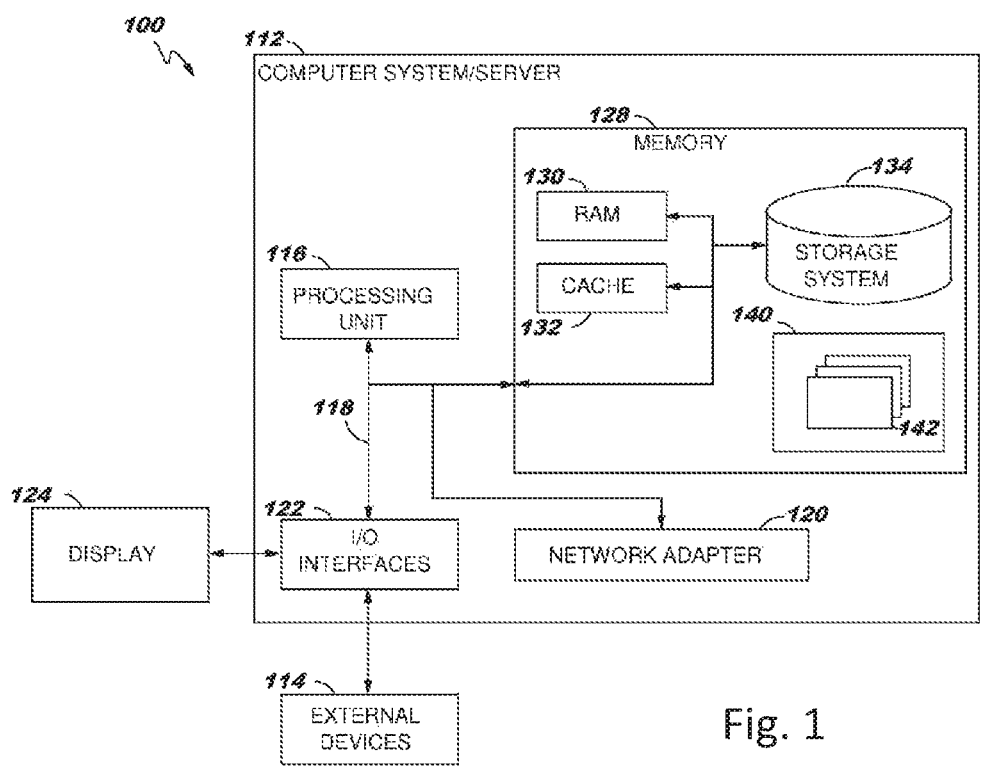
FIG. 1 is a block diagram of an illustrative data processing system in which various embodiments of the present disclosure may be implemented.

The design flow for an integrated circuit chip typically uses multiple tools to synthesize and implement a circuit design to provide the desired functionality while achieving certain timing, power and area goals. Timing of the circuit design is typically verified using a static timing analyzer. Optimizing software may be utilized by an engineer to perform transforms or other modifications on circuit elements such as gates, registers, interconnect, etc. to meet the design constraints in an optimizing process. Fixing timing violations often results in increasing the circuit area and power consumption. In addition, the optimizing software can be utilized to transform or otherwise modify the circuit design to reduce circuit area and power consumption of circuit elements not in the critical path. Circuit designs can include millions of gates, so the optimizing process needs to be quick and efficient to finish the circuit design in a reasonable amount of time.

Graph based analysis, GBA, uses worst case analysis to efficiently compute the timing of the circuit. GBA analysis is bounded by path based analysis, PBA. That is, an endpoint violation in PBA (i.e., the endpoint timing violates timing requirements) would always be an endpoint violation in GBA analysis, but an endpoint violation in GBA analysis may not violate timing requirements in GBA timing. Also, the amount of the timing violation in GBA would always be more pessimistic or the same as in PBA. As a result, an optimizing process using GBA may work harder on overcoming endpoint timing violations than necessary causing over-fixing of be circuit design for timing resulting in increased power consumption and/or increased area. This increase in chip area also increases the cost of the manufacturing of the circuit. In addition, over-fixing increases the circuit design time, thereby incurring additional costs.

GBA is often an order of magnitude faster and uses a smaller memory footprint than PBA and hence it is used to measure the change in circuit timing during optimization. An optimization process using optimizing software can invoke GBA analysis thousands of time to evaluate the improvements achieved by various transforms or other modifications of the circuit design. The subject method reduces the pessimism of GBA analysis allowing optimization to avoid over-fixing of the design. As a result, certain processes and devices may be implemented and utilized for reducing GBA pessimism. A faster form of circuit analysis may be utilized, such as GBA, with PBA utilized only for selected paths to reduce GBA pessimism for those paths. For example, PBA may only be utilized for the slowest or most critical paths identified with GBA. This reduces the amount of over-fixing of the circuit design, resulting in fewer increases of power consumption and area while maintaining the efficiency of GBA analysis, thereby allowing the optimization process to invoke GBA analysis thousands of time to evaluate the improvements achieved by various circuit modifications. These processes and apparatuses may be implemented and utilized as will be explained with reference to the various embodiments below.

FIG. 1 is a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as reducing graph based analysis pessimism.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system readable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for reducing graph based analysis pessimism.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
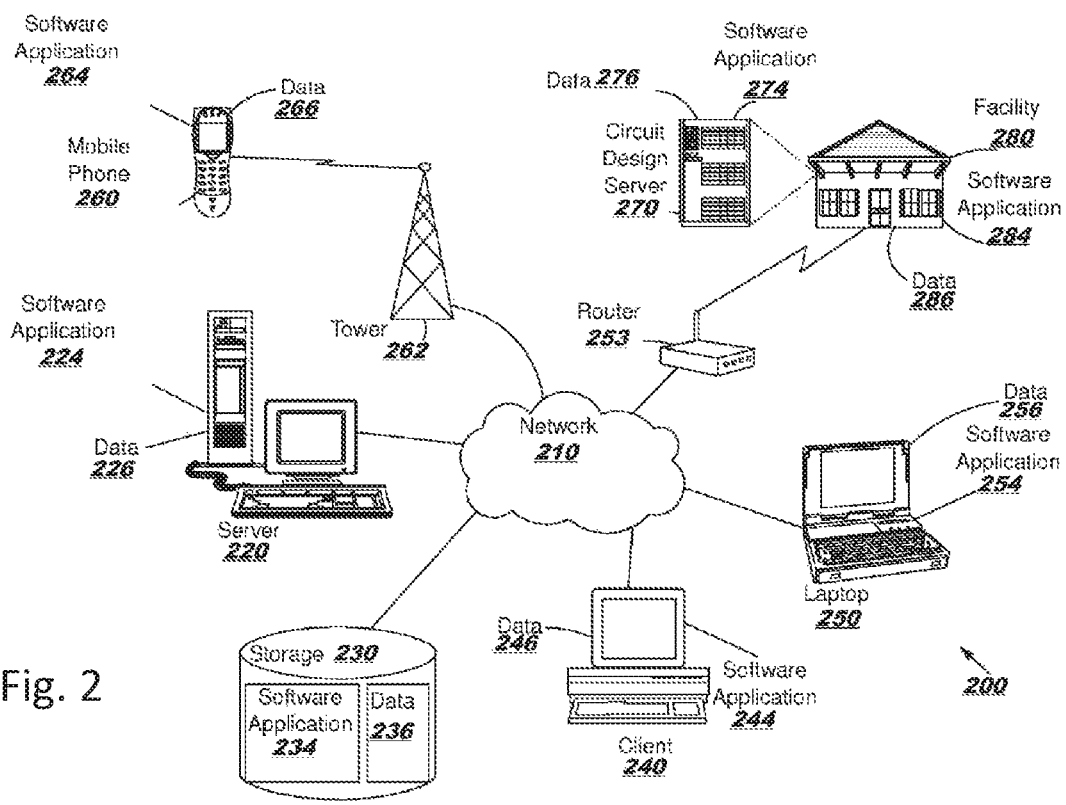
FIG. 2 is a block diagram of an illustrative network of data processing systems in which various embodiments of the present disclosure may be implemented.

FIG. 2 is a block diagram of an illustrative network of data processing systems in which various embodiments of the present disclosure may be implemented. Data processing environment 200 is a network of data processing systems such as described above with reference to FIG. 1. Software applications such as for reducing graph based analysis pessimism may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250, circuit design server 270 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260, circuit design server 270 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for reducing graph based analysis pessimism or other software applications and data in accordance with embodiments described herein. Storage 230 may contain software application 234 and a content source such as data 236 for reducing graph based analysis pessimism. Other software and content may be stored on storage 230 for sharing among various computer or other data processing devices. Client 240 may include software application 244 and data 246. Laptop 250 and mobile phone 260 may also include software applications 254 and 264 and data 256 and 266. Circuit design server 270 and facility 280 may include software applications 274 and 284 as well as data 276 and 286. Other types of data processing systems coupled to network 210 may also include software applications. Software applications could include a web browser, email, or other software application for reducing graph based analysis pessimism.

Server 220, storage unit 230, client 240, laptop 250, mobile phone 260, circuit design server 270 and facility 280 and other data processing devices may couple to network 210 using wired connections, wireless communication protocols, or other suitable data connectivity. Client 240 may be, for example, a personal computer or a network computer.

In the depicted example, server 220 or circuit design server 270 may provide data, such as boot files, operating system images, and applications to client 240 and laptop 250. Servers 220 and 270 may be a single computer system or a set of multiple computer systems working together to provide services in a client server environment. Client 240 and laptop 250 may be clients to servers 220 and 270 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
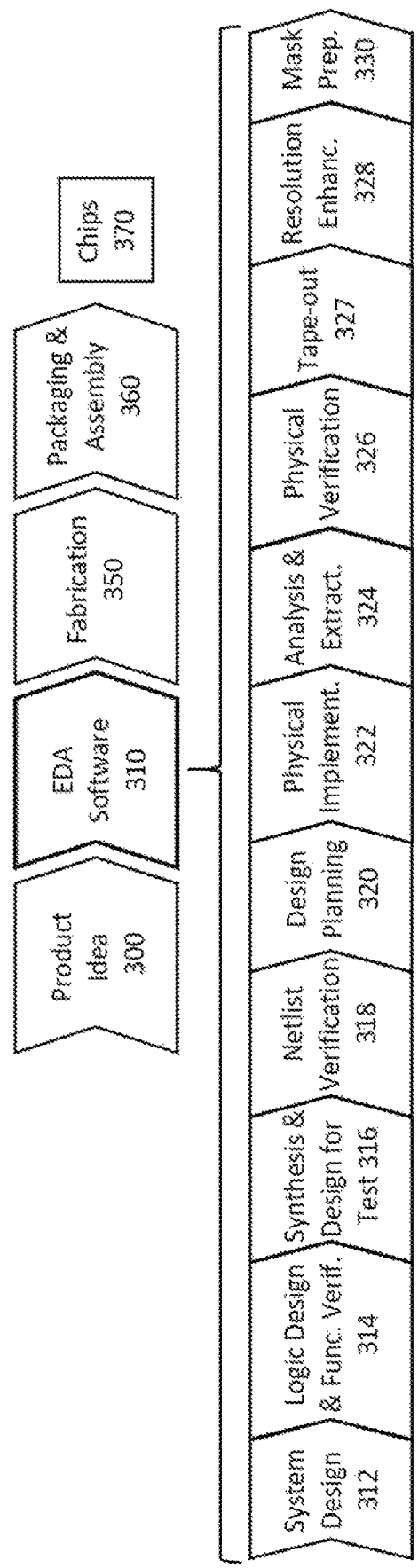
FIG. 3 shows a simplified representation of an illustrative integrated circuit design flow.

FIG. 3 shows a simplified representation of an illustrative design flow for designing an electronic circuit in particular an integrated circuit, IC. An implementation of a method according to the improved concept may for example be embedded within such design flow. However, an implementation of a method according to the improved concept may also be utilized within another design flow or independently from a design flow.

At a high level, the process starts with the product idea (step 300) and is realized in an Electronic Design Automation, EDA, software design process (step 310). When the design is finalized, it can be taped-out (step 327). At some point after tape-out, the fabrication process (step 350) and packaging and assembly processes (step 360) occur, resulting ultimately in finished IC chips (result 370).

The EDA software design process (step 310) itself is composed of a number of steps 312-330, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the component steps of the EDA software design process (step 310) is provided.

System design (step 312): Designers describe functionalities they want to implement. They may perform what-if planning to refine functionality, check costs, etc. Hardware-software architecture partitioning may be carried out at this stage.

Logic design and functional verification (step 314): At this stage, a VHDL, SystemVerilog or Verilog code for modules in the system is written and the design is checked for functional accuracy. More specifically, the design is checked to ensure that it produces correct outputs in response to particular input stimuli.

Synthesis and design for test (step 316): Here, the VHDL/Verilog is translated to a netlist. The netlist can be optimized for the target technology. Additionally, the design and implementation of tests to permit checking of the finished chip occurs.

Netlist verification (step 318): At this step, the netlist is checked for compliance with timing constraints and for correspondence with the VHDL/Verilog source code. Aspects of the improved concept, for example a method according to the improved concept, may be performed during this step 318.

Design planning (step 320): Here, an overall floorplan for the chip is constructed and analyzed for timing and top-level routing. Aspects of the improved concept, for example a method according to the improved concept, may be performed during this step 320.

Physical implementation (step 322): The placement (positioning of circuit elements) and routing (connection of the same) is carried out in this step (place-and-route process).

Analysis and extraction (step 324): In this step, the circuit function is verified at a transistor level, in turn permitting what-if refinement. Aspects of the improved concept, for example a method according to the improved concept, may be performed during this step 324.

Physical verification (step 326): At this step various checking functions are performed to ensure correctness for: manufacturing, electrical issues, lithographic issues, and circuitry.

Tape-out (step 327): This step provides the "tape-out" data to be used (after lithographic enhancements are applied if appropriate) for production of masks for lithographic use to produce finished chips.

Resolution enhancement (step 328): This step involves geometric manipulations of the layout to improve manufacturability of the design. This step for example includes optical proximity correction, OPC.

Mask data preparation (step 330): This step provides mask-making-ready "tape-out" data for production of masks for lithographic use to produce finished chips. Often this step includes partitioning or fracturing non-rectangular shaped islands into rectangles.

As mentioned, aspects of the improved concept may be performed during netlist verification (step 318), design planning (step 320) and/or during analysis and extraction (step 324). However, it may also be suitable to perform aspects of the improved concept during other steps of the EDA process or during steps of another circuit design process.

Figure 4:
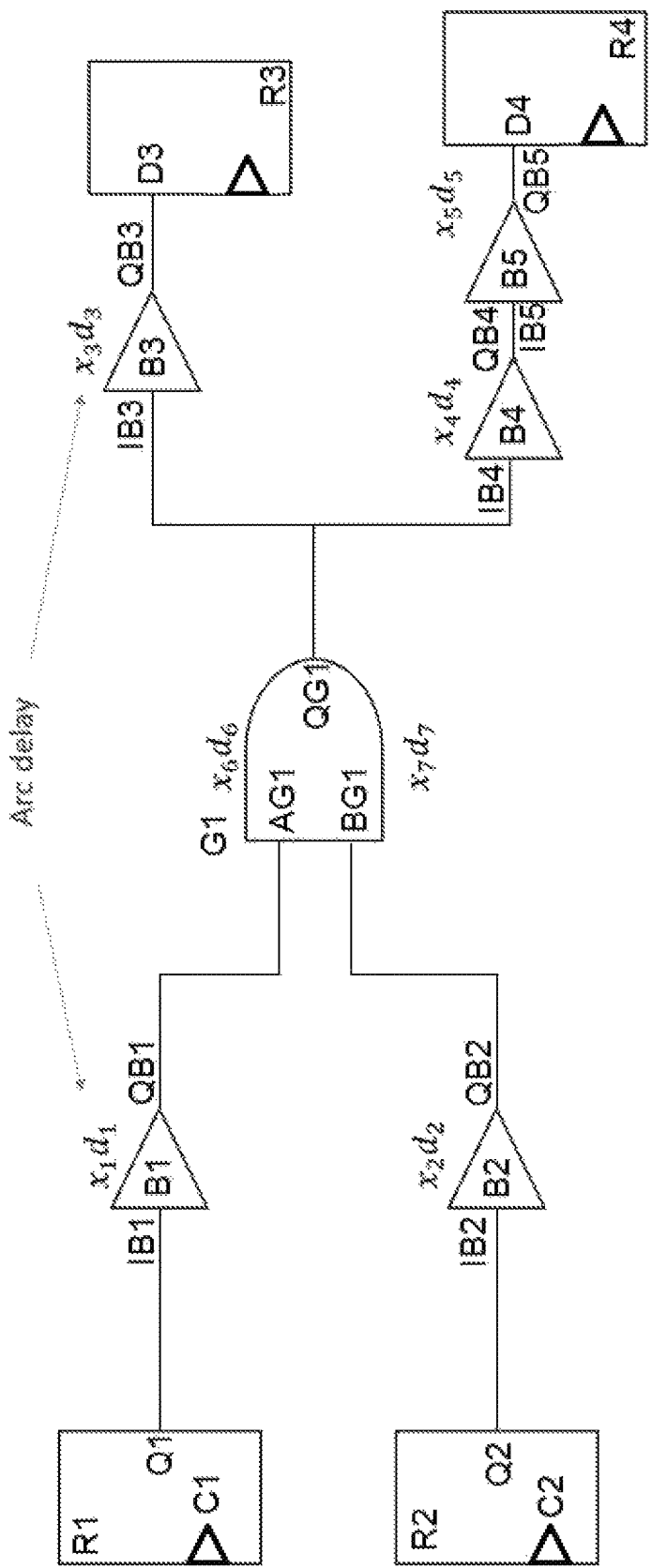
FIG. 4 shows an exemplary part of an integrated circuit design and aspects of an exemplary implementation of a method according to the improved concept.

FIG. 4 shows an exemplary part of an integrated circuit design and aspects of an exemplary implementation of a method according to the improved concept. The circuit design of FIG. 4 is chosen for exemplary reasons only. A method according to the improved concept may analogously be applied to different circuit designs.

The circuit design comprises a first register R1, a second register R2, a third register R3 and a fourth register R4. Each of the registers R1, R2, R3, R4 comprises for example a flip-flop and/or a latch. The circuit design further comprises a first buffer B1 with an input IB1 connected to an output Q1 of the first register R1 and a second buffer B2 with an input IB2 connected to an output Q2 of the second register R2. The circuit design comprises a logic gate G with a first input AG connected to an output QB1 of the first buffer B1 and with a second input BG connected to an output QB2 of the second buffer B2.

An output QG of the logic gate G is on one hand connected to an input IB3 of a third buffer B3 and on the other hand connected to an input IB4 of a fourth buffer B4. An output QB3 of the third buffer B3 is connected to a data input D3 of the third register R3. An output QB4 of the fourth buffer B4 is connected via a fifth buffer B5 (with input IB5 and output QB5) to a data input D4 of the fourth register R4. For clarity, the clock circuitry has been omitted from the diagram.

Consequently, the part of the circuit design shown in FIG. 4 depicts a first timing path P1, in particular a data segment of the first timing path P1, including for example a clock input C1 of the first register R1, the output Q1 of the first register R1, the input IB1 and output QB1 of the first buffer B1, the first input AG and the output QG of the logic gate G, the input IB3 and output QB3 of the third buffer B3 and the data input D3 of the third register R3. A second timing path P2, in particular a data segment of the second timing path P2, includes for example a clock input C2 of the second register R2, the output Q2 of the second register R2, the input IB2 and output QB2 of the second buffer B2, the second input BG and the output QG of the logic gate G, the input IB3 and output QB3 of the third buffer B3 and the data input D3 of the third register R3.

A third timing path P3, in particular a data segment of the third timing path P3, includes for example the clock input C1 of the first register R1, the output Q1 of the first register R1, the input IB1 and output QB1 of the first buffer B1, the first input AG and the output QG of the logic gate G, the input IB4 and output QB4 of the fourth buffer B4, the input IB5 and output QB5 of the fifth buffer B5 and the data input D4 of the fourth register R4.

A fourth timing path P4, in particular a data segment of the fourth timing path P4, includes for example the clock input C2 of the second register R2, the output Q2 of the second register R2, the input IB2 and the output QB2 of the second buffer B2, the second input BG and the output QG of the logic gate G, the input IB4 and output QB4 of the fourth buffer B4, the input IB5 and output QB5 of the fifth buffer B5 and the data input D4 of the fourth register R4.

The first register R1 acts as a launching device of the first and the third timing path P1, P3 and the second register R2 acts as a launching device of the second and the fourth timing path P2, P4. The third register R3 acts as a capturing device for the timing paths P1 and P2. The fourth register R4 acts as a capturing device for the timing paths P3 and P4. The data input D3 of the third register R3 may be considered as an endpoint of each of the timing paths P1 and P2. The data input D4 of the fourth register R4 may respectively considered as an endpoint of each of the timing paths P3 and P4.

For performing STA, timing signals may be initiated at the clock inputs C1, C2 of the first and the second register R1, R2 and propagated along the timing path P1, P2, P3, P4 until the data input D3, D4 of the third or the fourth register R3, R4, respectively. For the explanations in the following, only two timing parameters, for example an arrival time and signal slew, are considered. However, in general each timing signal may have a plurality of timing parameters, in particular more than two timing parameters. Further timing parameters may in particular be slack.

The slew corresponds for example to an average rate of change of output voltage per unit of time of a signal. In the following, a first slew value s1 is assumed for signals originating from the first register R1 and a second slew value s2 is assumed for signals originating from the second register R2, wherein the first slew value s1 may for example be greater than the second slew value s2. The first slew value s1 may also be called fast slew and the second slew value s2 may also be called slow slew. The arrival time represents a time elapsed for a signal to arrive at a certain point of the circuit design. As references, is in the following assumed that the arrival time is zero at the clock inputs C1, C2 of the first and the second register R1, R2. However, this choice is not to be considered limiting nor obligatory. Any other reference could be chosen analogously.

The arrival time of timing signals propagating along a timing path is updated for example by adding respective delay values associated to the cells or interconnects of the circuit design comprised by that timing path. In the following, it is without imposing any limitations assumed for example that interconnects cause zero delay and that also zero delay is caused by the registers R1, R2 between the clock input C1 and the output Q1 as well as between the clock input C2 and the output Q2. It is further assumed that the buffers B1, B2, B3, B4 and B5 as well as the logic gate cause a delay of 2 in arbitrary time units for signals having the first slew value s1 and a delay of 4 in the arbitrary time units for signals having the second slew value s2.

Consequently, according to PBA, a timing signal propagating along the first timing path P1 has the first slew value s1 and the following arrival times: 0 at IB1, 2 at AG, 4 at IB3 and 6 at D3. According to PBA, a timing signal propagating along the second timing path P2 has the second slew value s2 and the following arrival times: 0 at IB2, 4 at BG, 8 at IB3 and 12 at D3. According to PBA, a timing signal propagating along the third timing path P3 has the first slew value s1 and the following arrival times: 0 at IB1, 2 at AG, 4 at IB4, 6 at IB5 and 8 at D4. According to PBA, a timing signal propagating along the fourth timing path P4 has the second slew value s2 and the following arrival times: 0 at IB2, 4 at BG, 8 at IB4, 12 at IB5 and 16 at D4. It follows that the arrival time at the endpoints of the timing paths P1, P2, P3, P4 is according to PBA 6 for P1, 12 for P2, 8 for P3 and 16 for P4.

According to GBA, timing signals are for example merged at every shared node for example when some basic compatibility criteria of the timing signals are met. The timing parameters of the merged timing signal correspond to a most pessimistic choice with respect to arrival time. The arrival times at the endpoint of the timing paths are then computed based on delays computed for the merged signals. It follows that according to GBA, a merged signal with slew s2 is generated at the output QG of the logic gate G.

Thus, the arrival time at the endpoints of the timing paths P1, P2, P3, P4 is according to GBA 8 for P1, 12 for P2, 12 for P3 and 16 for P4. In particular, the GBA arrival times are larger than the PBA arrival times at the endpoints of timing paths P1 and P3.

According to the improved concept, a subset of timing paths of the set of timing paths P1, P2, P3, P4 in FIG. 4 is identified. In this example, paths P1 and P2 are chosen as a subset. However, the step of determining a subset of timing paths can be based on various different criteria. No limitation shall be made herein on how the subset of timing paths is chosen. For example it is possible to read the timing paths which are identified for the subset of timing paths from a file, to choose the subset of timing paths based on criteria provided as guidance by a user or to select a subset of timing paths which is stored already in memory. In case the timing parameters used in the method are slack times, timing paths can be chosen as a subset, which occur to have the most negative slack times in an initial GBA. It is possible to choose a percentage, e.g. 5 percent, of the timing paths of the set of timing paths with the most negative slack times. Alternatively it is possible to choose an absolute number, e.g. 100, of the timing paths with the most negative slack time.

According to one example implementation of the improved concept, an initial GBA has been conducted, which determined the GBA arrival times of the selected paths P1 and P2 to be 8 for P1 and 12 for P3. On the above chosen subset of timing paths, in this case timing paths P1 and P2, a PBA is performed to determine the PBA arrival times of those paths. The PBA arrival times for those paths have been determined to be 6 for P1 and 12 for P2.

| Path | PBA Arrival Time | Initial GBA Arrival Time |
| --- | --- | --- |
| P1 | 6 | 8 |
| P2 | 12 | 12 |

In this example it is evident, that the initial GBA is more pessimistic regarding the arrival time of path P1 than the PBA. Hence, it is one aim of the improved concept to compute optimized GBA arrival times for the selected subset of timing paths.

According to one embodiment of the improved concept, a cost function to minimize the difference between those optimized GBA arrival times and PBA arrival times is solved. In this example, we solve the following cost function:

$$J = \frac{1}{2}\sum_{i=1}^{m}(f^{(i)}(x) - y^{(i)})^2$$

wherein $y^{(i)}$ is the PBA arrival time of the i-th path, m is a total number of the timing paths of the subset of timing paths and $f^{(i)}(x)$ is the optimized GBA arrival time of the i-th path and wherein $f^{(i)}(x)$ is given as:

$$f^i(x) = \sum_j x_j d_j$$

wherein $d_j$ is the delay of the j-th circuit element of the i-th path and $x_j$ is a delay multiplier of the j-th circuit element of the i-th path.

In the example according to the embodiment of FIG. 4, the following values and variables are given. The total number of paths of the subset of selected paths is two and therefore m=2. As described in detail above, the PBA arrival time for path P1 is $y^{(1)}=6$ and the PBA arrival time for path P2 is $y^{(2)}=12$. In path P1 the following circuit elements occur: B1, G (through input AG) and B3. Those elements have, as in detail explained above, regarding GBA the following delay values $d_j$. The delay value of B1 is $d_{B1}=2$, the delay value of G (through input AG) is $d_{AG}=2$ and the delay value of B3 is $d_{B3}=4$ according to GBA. In path P2 the following circuit elements occur: B2, G (through input BG) and B3. Those elements have, as in detail explained above, regarding GBA the following delay values $d_j$. The delay value of B2 is $d_{B2}=4$, the delay value of G (through input BG) is $d_{BG}=4$ and the delay value of B3 is $d_{B3}=4$ according to GBA. In GBA, the delay value of a circuit element does not depend on the path in which it is implemented. However if a circuit element has several inputs, in this embodiment, the delay value may depend on which input is used.

Hence for $f^{(i)}(x)$ we receive the equations:

$$f^1(x)=x_{B1}d_{B1}+x_{AG}d_{AG}+x_{B3}d_{B3}=2x_{B1}+2x_{AG}+4x_{B3}$$

and $$f^2(x)=x_{B2}d_{B2}+x_{BG}d_{BG}+x_{B3}d_{B3}=4x_{B2}+4x_{BG}+4x_{B3}.$$

According to one embodiment of the improved concept, the following constraints are applied to minimize the above cost function. Those constraints correspond to the fact that the arrival times of GBA are bound by the arrival times of PBA. Since GBA is more pessimistic, the GBA arrival times are at least as high as the corresponding PBA arrival times:

$$f^{(i)}(x) \geq y^{(i)}$$

and therefore in the example of FIG. 4:

$$f^{(1)}(x) \geq 6$$

$$f^{(2)}(x) \geq 12$$

Any proper optimization method can be chosen to solve the above problem. For reasons of simplicity we assume for $x_j$ the following values which result in a sufficient small J (in this case a total minimum of J=0) and therefore sufficiently minimize the cost function: $x_{B1}=x_{AG}=0.5$ and $x_{B3}=x_{B2}=x_{BG}=1$.

Those $x_j$ are delay multipliers, wherein each delay multiplier corresponds to one certain circuit element of paths P1 and P2. With the above chosen values for $x_j$ we receive optimized GBA arrival times $f^{(i)}(x)$ for the subset of timing paths:

| Path | PBA Arrival Time | Initial GBA Arrival Time | Optimized GBA Arrival Time |
|---|---|---|---|
| P1 | 6 | 8 | 6 |
| P2 | 12 | 12 | 12 |

The computed delay multipliers $x_j$ can be stored in memory of a device used or in external memory and be used to reduce pessimism in any subsequent GBA performed on timing paths which include at least one of the circuit elements for which a delay multiplier $x_j$ was computed. Accordingly, the same delay multipliers $x_j$ are used for any subsequent GBA as described above, without the need to run the complete optimization process.

In the example embodiment of FIG. 4, GBA can be performed on the timing paths P3 and P4 as described above. GBA returns the value 12 for P3 and 16 for P4. Timing path P3 comprises the circuit elements B1, G (through input AG), B4 and B5. Those elements have, as in detail explained above, regarding GBA the following delay values $d_j$ in path P3. The delay value of B1 is $d_{B1}=2$, the delay value of G (through input AG) is $d_{AG}=2$, the delay value of B4 is $d_{B4}=4$ and the delay value of B5 is $d_{B5}=4$ according to GBA. Timing path P4 comprises the following circuit elements: B2, G (through input BG), B4 and B5. Those elements, as in detail explained above, have regarding GBA the following delay values $d_j$ in path P4. The delay value of B2 is $d_{B2}=4$, the delay value of G (through input BG) is $d_{BG}=4$, the delay value of B4 is $d_{B4}=4$ and the delay value of B5 is $d_{B5}=4$ according to GBA.

The arrival times of the GBA of timing paths P3 and P4 shall be optimized by reducing pessimism based on the earlier computed and stored correction factors. To reduce pessimism in the GBA of paths P3 and P4, the stored delay multipliers are used without conducting an optimization algorithm as above. Since the delay multipliers for several of the circuit elements of timing paths P3 and P4 have been computed with respect to the timing paths P1 and P2, i.e. paths P3 and P4 share several circuit elements with timing paths P1 and P2, the computed delay multipliers are used to determine optimized GBA arrival times for timing paths P3 and P4. The optimized GBA arrival times for timing paths P3 and P4 are defined by the following equations:

$$f^3(x)=x_{B1}d_{B1}+x_{AG}d_{AG}+x_{B4}d_{B4}+x_{B5}d_{B5}$$

and $$f^4(x)=x_{B2}d_{B2}+x_{BG}d_{BG}+x_{B4}d_{B4}+x_{B5}d_{B5}.$$

The following delay multipliers for paths P3 and P4 are known: $x_{B1}=x_{AG}=0.5$ and $x_{B2}=x_{BG}=x_{B3}=1$. Hence, only the delay multipliers $x_{B4}$ and $x_{B5}$ are unknown. According to one embodiment of the improved concept, the delay values of timing paths P3 and P4 are multiplied with the corresponding delay multipliers, if they have been computed and stored in the optimization before, and the delay values of circuit elements of timing paths P3 and P4 are multiplied with a factor 1, in case no delay multiplier is known for certain circuit elements to receive the optimized GBA arrival times. In this case, we accordingly choose $x_{B4}=x_{B5}=1$. Therefore we receive for the optimized GBA arrival times the following results:

$$f^3(x)=x_{B1}d_{B1}+x_{AG}d_{AG}+x_{B4}d_{B4}+x_{B5}d_{B5}=10$$

and $$f^4(x)=x_{B2}d_{B2}+x_{BG}d_{BG}+x_{B4}d_{B4}+x_{B5}d_{B5}=16.$$

Now we can compare the optimized GBA arrival times of paths P3 and P4 with the initial GBA arrival times and the PBA arrival times of those paths:

| Path | PBA Arrival Time | Initial GBA Arrival Time | Optimized GBA Arrival Time |
|---|---|---|---|
| P3 | 8 | 12 | 10 |
| P4 | 16 | 16 | 16 |

The arrival time of path P3 according to the optimized GBA is evidently less pessimistic than the arrival time of path P3 according to the initial GBA. The optimized GBA arrival time of path P3 is in this example still more pessimistic than the PBA arrival time of path P3. However, the method to compute the optimized GBA arrival times according to the improved concept is less exhaustive and faster than running PBA for every single path of the timing paths of interest. Therefore, with the method according to the improved concept, less runtime and memory are consumed while providing timing parameters with reduced pessimism compared to conventional GBA methods.

In the present example, less pessimistic arrival times may for example correspond to smaller arrival times, depending on a type of constraint. That means, according timing accuracy is improved with respect to GBA. In addition, according to the improved concept, complexity and computing time is reduced compared to PBA due to the described computing of correction factors and determining of optimized GBA timing parameters.

Figure 5:
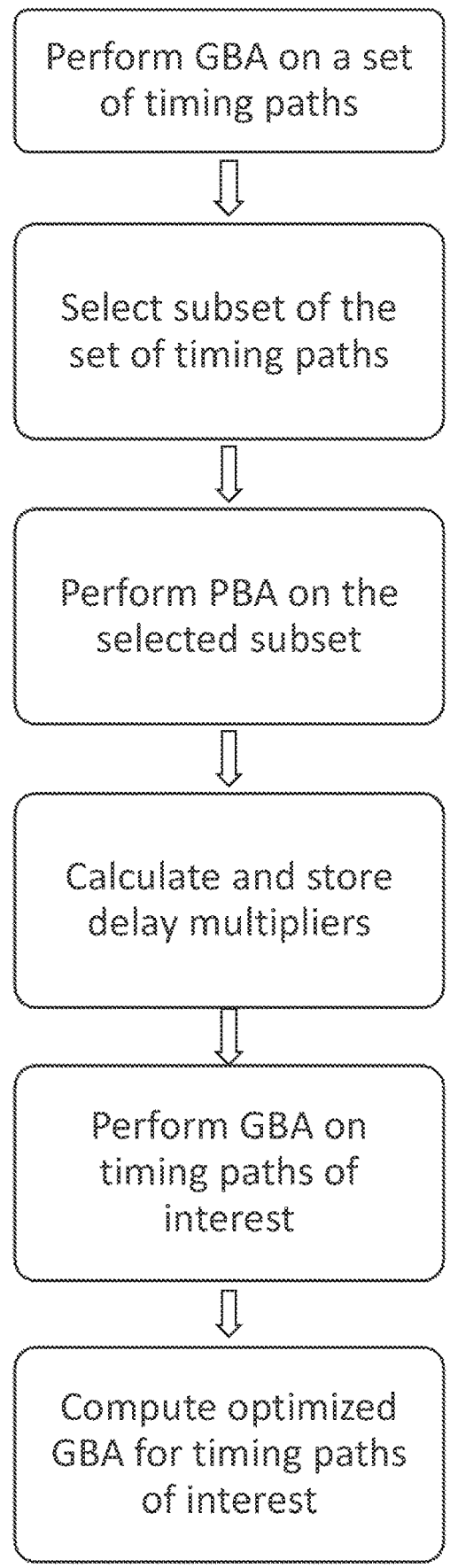
FIG. 5 shows a flow chart of a method according to one implementation of the improved GBA.

FIG. 5 is a flow diagram of a method to reduce pessimism in graph-based statistical timing analysis, GBA, according to one embodiment of the improved concept. In a first step 400, GBA is performed on a circuit design. This circuit design may be a microprocessor with tens of thousands of endpoint circuits or a simple circuit with few endpoints such as an amplifier. In one embodiment, the GBA is performed on the full circuit design.

This can include multiple sub-steps. First, the graph is built from the circuit design based on design connectivity and user constraints (like clocks). This might have been already performed with a previous GBA analysis. Any incremental changes to circuit and constraints are updated. Secondly, the timing for all paths and circuit elements for each endpoint circuit is determined using graph based analysis under GBA assumptions (e.g., worst pin input slew, no AOCV, etc.). At the end of this analysis, an expected arrival time is available at each node of the graph. Under graph based analysis, the arrival time at each node is the worst arrival time of all paths going through that node. Thirdly, in this embodiment, the slack is calculated at each endpoint node by comparing the determined arrival time to a required time. That is, the time calculated for each path is subtracted from the time required for each endpoint circuit. The slack for each path is then stored in memory. If the slack is negative (i.e., the required time is smaller than the calculated arrival time), then the endpoint has a timing violation because the signal for that path did not arrive in time.

In step 410, a subset of paths is selected for GBA pessimism reduction by path based analysis. This subset is referred to herein as a GBA subset. This can be the endpoints with the worst percentage or absolute number of paths (e.g. those x % or n paths) with most negative slack time or other measure such as those longest paths (most circuit elements) with negative slack as these paths may most need correction. This GBA subset could include all of the failed paths. Alternatively, this can be a list of endpoints read from a file, criteria provided as guidance by user, or a list stored in memory. Similarly, the number of paths to compute for each endpoint can be predetermined (e.g., 100), read from a file or other computer readable media, or provided as guidance by a user. When selecting a subset of set timing paths, any number of timing paths can be selected. The more timing paths are selected, the longer the process may take, but the more correction factors will be computed in order to optimize GBA timing parameters. According to one embodiment of the improved concept, timing paths are chose, which do not propagate along shared circuit elements in order to compute as many correction factors as possible for a minimum number of timing paths.

In step 420, GBA path delay and slack is then computed utilizing path based analysis for the GBA subset of the selected GBA subset from step 410. This can include multiple sub-steps. First, the type of pessimism reduction utilized during PBA analysis is determined. The PBA analysis can be performed taking into account all the types of pessimism reduction (statistical such as AOCV and non-statistical such as worst slew) or only some of them. For example, the analysis can be set to be AOCV only, meaning only the AOCV effects are corrected for PBA. In that case only the AOCV depth would be recalculated by path based analysis but slew and signal integrity effects would not be recalculated. This provides a mechanism of trading off runtime for accuracy. Performing full PBA analysis for all the effects is expensive but more accurate. The type of PBA analysis could be determined by how much a path failed the GBA analysis. A worse failing path may be allocated to full PBA analysis and a less failing path may be allocated to AOCV path based analysis. This differentiation can be done manually or applied automatically according to predetermined criteria. This differentiation may also be applied on an endpoint by endpoint basis. Secondly, in step 420 the PBA analysis is performed on the GBA path subset selected above using the newly applied path based allocations. Thirdly, in step 420, the PBA slack is stored in memory for each of these paths. That is, each GBA subset path will have a PBA slack determined.

According to one embodiment of the improved concept, in step 430, delay multipliers are calculated and stored. In order to calculate the delay multipliers, a cost function (also called loss function) is constructed, based on the in step 420 determined PBA slack times and optimized GBA slack times. In order to reduce pessimism in the GBA slack times, optimized GBA slack times are determined which minimize the cost function. The cost function comprises the sum of the quadratic differences between the optimized GBA slack times and the PBA slack times for each timing path of the GBA subset. The optimized GBA slack times are therefore chosen in such way that the optimized GBA slack times are as similar as possible to the PBA slack times in order to minimize the sum of the cost function.

The optimized GBA slack times for each path of the GBA subset again are a function of the cell delay (or net delay) of each circuit element of each path and a correction factor which is a delay multiplier corresponding to each cell delay. In fact, the optimized GBA slack time of a certain timing path is the sum of the cell delay multiplied with its corresponding delay multiplier of every circuit element which occurs in that path. The cell delay values for GBA are known or can be assumed. In another embodiment, the cell delay values are determined from an initial GBA conducted on the GBA subset. Question to inventor: Please confirm previous sentence.

The delay multipliers are chosen in such way that the cost function is minimized. In order to determine those delay multipliers, in this embodiment, constraints are assumed to solve the minimization problem. In this embodiment, the given constraints correspond to the boundary conditions given by the fact, that the GBA slack times (and therefore also the optimized GBA slack times) have to be lower or equal to the PBA slack times. This boundary condition originates from the fact, that for example, an endpoint violation in PBA analysis would always be an endpoint violation in GBA analysis, but an endpoint violation in GBA analysis may not violate timing in PBA timing.

Using said boundary conditions, in step 430, the delay multipliers are determined and stored. To determine the delay multipliers, i.e. minimize the cost function subject to said boundary conditions, according to one embodiment of the improved concept, the gradient decent method. However, the method according to the improved concept may utilize any other method to solve the optimization problem.

Then in step 440, graph based analysis can be performed of the circuit design. This analysis can be a full GBA of the whole circuit design or an incremental GBA of only those paths which shall be optimized in a subsequent step. In step 450, the GBA conducted in step 440 shall be optimized. In order to optimize, i.e. reduce pessimism in the GBA of step 440, the previously computed and stored delay multipliers are used to enhance and correct the GBA slack times of step 440 regarding slack time values which a PBA would provide. The pessimism in the GBA slack times is reduced by multiplying each GBA cell delay of each path with its corresponding, in step 430 determined and stored delay multiplier. Since delay multipliers were only computed for a subset of timing paths, it may occur, that not every cell delay value for every circuit element has a corresponding delay multiplier stored in memory. In this case, a delay multiplier of 1 is assumed in this embodiment of the improved concept. Therefore, the cell delay of a circuit element for which no delay multiplier has been computed and/or stored, is not corrected in this embodiment. However, other methods may be applied, in case no determined delay multiplier is available.

The invention claimed is:

1. A method for performing graph-based static timing analysis (GBA) of an integrated circuit design having a set of timing paths, the method comprising:
   identifying a subset of the set of timing paths;
   performing path-based analysis (PBA) of the subset of timing paths to determine at least one PBA timing parameter for each timing path of the subset of timing paths; and
   determining, by a processor, at least one optimized GBA timing parameter for at least one timing path of the subset of timing paths by minimizing a function that is based on a difference between the at least one optimized GBA timing parameter and the at least one PBA timing parameter of the at least one timing path.

2. The method of claim 1, wherein determining at least one optimized GBA timing parameter comprises determining a correction factor for at least one selected circuit element of at least one timing path of the subset of timing paths.

3. The method of claim 2, wherein the delay multiplier is stored and used to reduce pessimism in subsequent GBA of timing paths propagating along at least one of the selected circuit elements.

4. The method of claim 3, wherein in subsequent GBA a delay of each circuit element in at least one timing path of the GBA is multiplied with each corresponding correction factor if a correction factor has been determined and stored and with a factor one if no correction factor has been determined and/or stored.

5. The method according to claim 1, wherein determining the at least one optimized GBA timing parameter comprises solving a quadratic programming problem.

6. The method according to claim 5, wherein solving the quadratic programming problem comprises using one or more of: a gradient decent method, an interior point method, an active set method, an augmented Lagrangian method, or a conjugate gradient method.

7. The method according to claim 1, wherein the quadratic programming problem being solved comprises minimizing a quadratic cost function of the at least one optimized GBA timing parameter and the corresponding at least one PBA timing parameter subject to linear constraints regarding the at least one GBA timing parameter and the at least one PBA timing parameter.

8. The method according to claim 7, wherein the quadratic cost function J to be minimized is:

$$J = \frac{1}{2}\sum_{i=1}^{m} (f^{(i)}(x) - y^{(i)})^2$$

wherein $y^{(i)}$ is the PBA timing parameter of an i-th path of the subset, m is a total number of identified timing paths of the subset of timing paths and $f^{(i)}(x)$ is the optimized GBA timing parameter of an i-th path of the subset and wherein $f^{(i)}(x)$ is given as:

$$f^{(i)}(x) = \sum_{j} x_j d_j$$

wherein j represents the circuit elements occurring in the i-th path of the subset and $d_j$ is a delay of the j-th circuit element of the i-th path of the subset and $x_j$ is the correction factor of the j-th circuit element of the i-th path.

9. The method according to claim 7, wherein the at least one timing parameter comprises the slack time and the linear constraint on the slack time is given by the slack time of PBA being equal to or higher than the slack time of GBA and the correction factor is a delay multiplier.

10. The method according to claim 7, wherein the at least one timing parameter comprises the arrival time and the linear constraint on the arrival time is given by the arrival time of GBA being equal to or higher than the arrival time of PBA and the correction factor is a delay multiplier.

11. The method according to claim 1, wherein the identified subset of timing paths is based on an initial GBA and the identified subset of timing paths is the subset of timing paths with lowest negative GBA slack time.

12. The method of claim 11, wherein the number of identified timing paths of the subset of timing paths is predetermined.

13. A non-transitory computer readable medium storing instructions that, when executed by a processor, cause the processor to perform a method for graph-based static timing analysis (GBA) of an integrated circuit design having a set of timing paths, the method comprising:
    identifying a subset of the set of timing paths;

performing path-based analysis (PBA) of the subset of timing paths to determine at least one PBA timing parameter for each timing path of the subset of timing paths; and determining at least one optimized GBA timing parameter for at least one timing path of the subset of timing paths by minimizing a function that is based on a difference between the at least one optimized GBA timing parameter and the at least one PBA timing parameter of the at least one timing path.

14. The non-transitory computer readable medium of claim 13, wherein determining at least one optimized GBA timing parameter comprises determining a correction factor for at least one selected circuit element of at least one timing path of the subset of timing paths.

15. The non-transitory computer readable medium of claim of claim 14, wherein the delay multiplier is stored and used to reduce pessimism in subsequent GBA of timing paths propagating along at least one of the selected circuit elements.

16. The non-transitory computer readable medium of claim of claim 15, wherein in subsequent GBA a delay of each circuit element in at least one timing path of the GBA is multiplied with each corresponding correction factor if a correction factor has been determined and stored and with a factor one if no correction factor has been determined and/or stored.

17. A data processing system for performing graph-based static timing analysis (GBA) of an integrated circuit design having a set of timing paths, the data processing system comprising:

a processor; and a memory storing program instructions which when executed by the processor cause the processor to execute the steps of:

identifying a subset of the set of timing paths;

performing path-based analysis (PBA) of the subset of timing paths to determine at least one PBA timing parameter for each timing path of the subset of timing paths; and determining at least one optimized GBA timing parameter for at least one timing path of the subset of timing paths by minimizing a function that is based on a difference between the at least one optimized GBA timing parameter and the at least one PBA timing parameter of the at least one timing path.

18. The data processing system of claim 17, wherein determining at least one optimized GBA timing parameter comprises determining a correction factor for at least one selected circuit element of at least one timing path of the subset of timing paths.

19. The data processing system of claim 18, wherein the delay multiplier is stored and used to reduce pessimism in subsequent GBA of timing paths propagating along at least one of the selected circuit elements.

20. The data processing system of claim 19, wherein in subsequent GBA a delay of each circuit element in at least one timing path of the GBA is multiplied with each corresponding correction factor if a correction factor has been determined and stored and with a factor one if no correction factor has been determined and/or stored.

* * * * *